US009516102B2

(12) United States Patent
Liu et al.

(10) Patent No.: US 9,516,102 B2
(45) Date of Patent: Dec. 6, 2016

(54) SERVER TO CLIENT REVERSE PERSISTENCE

(71) Applicant: F5 NETWORKS, INC., Seattle, WA (US)

(72) Inventors: Tao Liu, Issaquah, WA (US); Nat Thirasuttakorn, Bangkok (TH); Songbo Zheng, Bellevue, WA (US)

(73) Assignee: F5 Networks, Inc., Seattle, WA (US)

( * ) Notice: Subject to any disclaimer, the term of this patent is extended or adjusted under 35 U.S.C. 154(b) by 168 days.

(21) Appl. No.: 13/789,386

(22) Filed: Mar. 7, 2013

(65) Prior Publication Data

US 2014/0258369 A1 Sep. 11, 2014

(51) Int. Cl.
*H04L 29/08* (2006.01)
*H04L 12/725* (2013.01)
*H04L 12/801* (2013.01)
*G06F 9/50* (2006.01)

(52) U.S. Cl.
CPC ......... *H04L 67/1002* (2013.01); *H04L 45/306* (2013.01); *H04L 67/1027* (2013.01); *H04L 67/2804* (2013.01); *G06F 9/505* (2013.01); *H04L 47/10* (2013.01)

(58) Field of Classification Search
None
See application file for complete search history.

(56) References Cited

U.S. PATENT DOCUMENTS

| 5,513,314 | A | 4/1996 | Kandasamy et al. | |
|---|---|---|---|---|
| 6,430,619 | B1 * | 8/2002 | Sitaraman | H04L 12/4641 709/217 |
| 6,539,425 | B1 * | 3/2003 | Stevens | H04L 61/1523 709/220 |
| 7,296,078 | B2 * | 11/2007 | Sanchez Herrero | H04L 12/2898 709/202 |
| 7,899,918 | B1 * | 3/2011 | Potter | H04L 12/14 709/202 |

(Continued)

OTHER PUBLICATIONS

MacVittie, Lori "Message Based Load Balancing" (Technical Brief(2010), pp. 1-9).*

(Continued)

*Primary Examiner* — Ranodhi Serrao
*Assistant Examiner* — James Fiorillo
(74) *Attorney, Agent, or Firm* — John W. Branch; Lowe Graham Jones PLLC

(57) ABSTRACT

Embodiments may be directed towards enabling one or more load balance servers to maintain connection flow persistence if the server initiates to the communication to a client. A packet traffic management device may (PTMD) intercept the request from the server and generate reverse persistence information. The PTMD may include a portion of the reverse persistence information in the request before forwarding the request to the targeted client device. The client device may send the response to the PTMD. The PTMD may employ reverse persistence information to identify the target server. The PTMD may remove the reverse persistence information from the response sent by the client and forward the response to the determined server. Removing the reverse persistence information may remove evidence that the PTMD intervened in the connection between the client and server.

20 Claims, 8 Drawing Sheets

(56) References Cited

U.S. PATENT DOCUMENTS

| | | | |
|---|---|---|---|
| 8,201,219 B2* | 6/2012 | Jones | G06F 9/505 |
| | | | 709/225 |
| 8,555,350 B1 | 10/2013 | Shatzkamer | |
| 8,621,078 B1* | 12/2013 | Mukerji | H04L 67/2814 |
| | | | 709/225 |
| 8,788,570 B2* | 7/2014 | Goel | 370/235 |
| 8,904,028 B2 | 12/2014 | Iannaccone et al. | |
| 2004/0047348 A1* | 3/2004 | O'Neill | H04L 63/0892 |
| | | | 370/389 |
| 2005/0091396 A1 | 4/2005 | Nilakantan et al. | |
| 2005/0188109 A1 | 8/2005 | Shiga et al. | |
| 2006/0171365 A1 | 8/2006 | Borella | |
| 2007/0258465 A1* | 11/2007 | Ma | H04W 28/08 |
| | | | 370/395.53 |
| 2009/0083861 A1* | 3/2009 | Jones | G06F 9/505 |
| | | | 726/29 |
| 2009/0247120 A1 | 10/2009 | Heutschi | |
| 2009/0265467 A1* | 10/2009 | Peles | H04L 47/10 |
| | | | 709/226 |
| 2010/0061394 A1 | 3/2010 | Sindhu et al. | |
| 2010/0287227 A1* | 11/2010 | Goel | H04L 67/1002 |
| | | | 709/202 |
| 2010/0299451 A1* | 11/2010 | Yigang | H04L 45/306 |
| | | | 709/241 |
| 2011/0026403 A1 | 2/2011 | Shao et al. | |
| 2011/0040845 A1* | 2/2011 | Cai | H04L 47/10 |
| | | | 709/206 |
| 2011/0185065 A1* | 7/2011 | Stanisic | G06F 9/505 |
| | | | 709/226 |
| 2011/0200054 A1 | 8/2011 | Craig et al. | |
| 2011/0202614 A1 | 8/2011 | Graig et al. | |
| 2011/0231649 A1 | 9/2011 | Bollay et al. | |
| 2011/0231652 A1 | 9/2011 | Bollay et al. | |
| 2011/0231653 A1 | 9/2011 | Bollay et al. | |
| 2012/0131202 A1* | 5/2012 | Qiu | H04L 65/1016 |
| | | | 709/227 |
| 2012/0240184 A1* | 9/2012 | Thirasuttakorn | H04W 12/08 |
| | | | 726/1 |
| 2013/0097330 A1* | 4/2013 | Qiu | H04L 12/6418 |
| | | | 709/228 |
| 2014/0006632 A1* | 1/2014 | Evens | H04L 65/605 |
| | | | 709/227 |

OTHER PUBLICATIONS

Fajardo, V. I., "Open Diameter Software Architecture," Version 1.0.7, Jun. 25, 2004, 6 pages http://diameter.sourceforge.net/diameter-architecture/index.html, accessed Sep. 2, 2008.

"Deploying the BIG-IP LTM for Diameter Load Balancing" Deployment Guide, Version 1.0, Sep. 22, 2010, 21 pages.

"Respond to server depending on TCP::client_port," DevCentral Forums, accessed Mar. 26, 2010, 6 pages http://devcentral.f5.com/Default.aspx?tabid=53&forumid=5&tpage=1&v . . . .

Liu, J. et al., "Introduction to Diameter," IBM, Jan. 24, 2006, 11 pages http://www.ibm.com/developerworks/library/wi-diameter/index.html.

"Diameter (protocol)," Wikipedia.com, accessed Feb. 3, 2012, 10 pages http://en.wikipedia.org/wiki/Diameter_(protocol).

International Search Report and Written Opinion for International Application No. PCT/US2014/019129, mailed on Apr. 29, 2014.

Official Communication for U.S. Appl. No. 13/828,664 mailed on Feb. 25, 2015, 18 pages.

Official Communication for U.S. Appl. No. 13/828,664 mailed on Dec. 18, 2015, 18 pages.

Official Communication for U.S. Appl. No. 13/773 332 mailed Jan. 8, 2015, 20 pages.

Official Communication for U.S. Appl. No. 13/240,812 mailed on Oct. 13, 2015, 9 pages.

Official Communication for U.S. Appl. No. 13/240,812 mailed on Apr. 23, 2015, 11 pages.

Official Communication for U.S. Appl. No. 13/773,332 mailed Jun. 30, 2015, 5 pages.

Official Communication for U.S. Appl. No. 14/871,453 mailed Mar. 23, 2016, 5 pages.

Official Communication for U.S. Appl. No. 14/871,453 mailed on Jul. 25, 2016, 6 pages.

* cited by examiner

SERVER TO CLIENT REVERSE PERSISTENCE

TECHNICAL FIELD

Various embodiments relate generally to load balancing of computing resources in a networked environment, and more particularly to, improving performance by enabling load balanced servers to initiate requests to clients.

BACKGROUND

High performance/high availability client-server computing systems often employ multiple application server devices. Often multiple servers are used provide a services or applications to many client devices. Network traffic management devices (e.g., load balancers) may be used to distribute client requests to one or more of the servers. Network traffic management devices (TMDs) may be arranged so the identity and/or quantity of servers available to process requests may be transparent and unknown to the client devices. Accordingly, TMDs receive client requests and forward the requests the appropriate servers. If servers respond to client requests, they send the responses to the TMD and the TMD may forward these responses to the appropriate client devices. The TMD may maintain state information that enables the server responses to be forwarded to the appropriate client devices. In some cases, a server that is configured to communicate through a TMD may be required to initiate a communication session by sending a first request to a client device. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
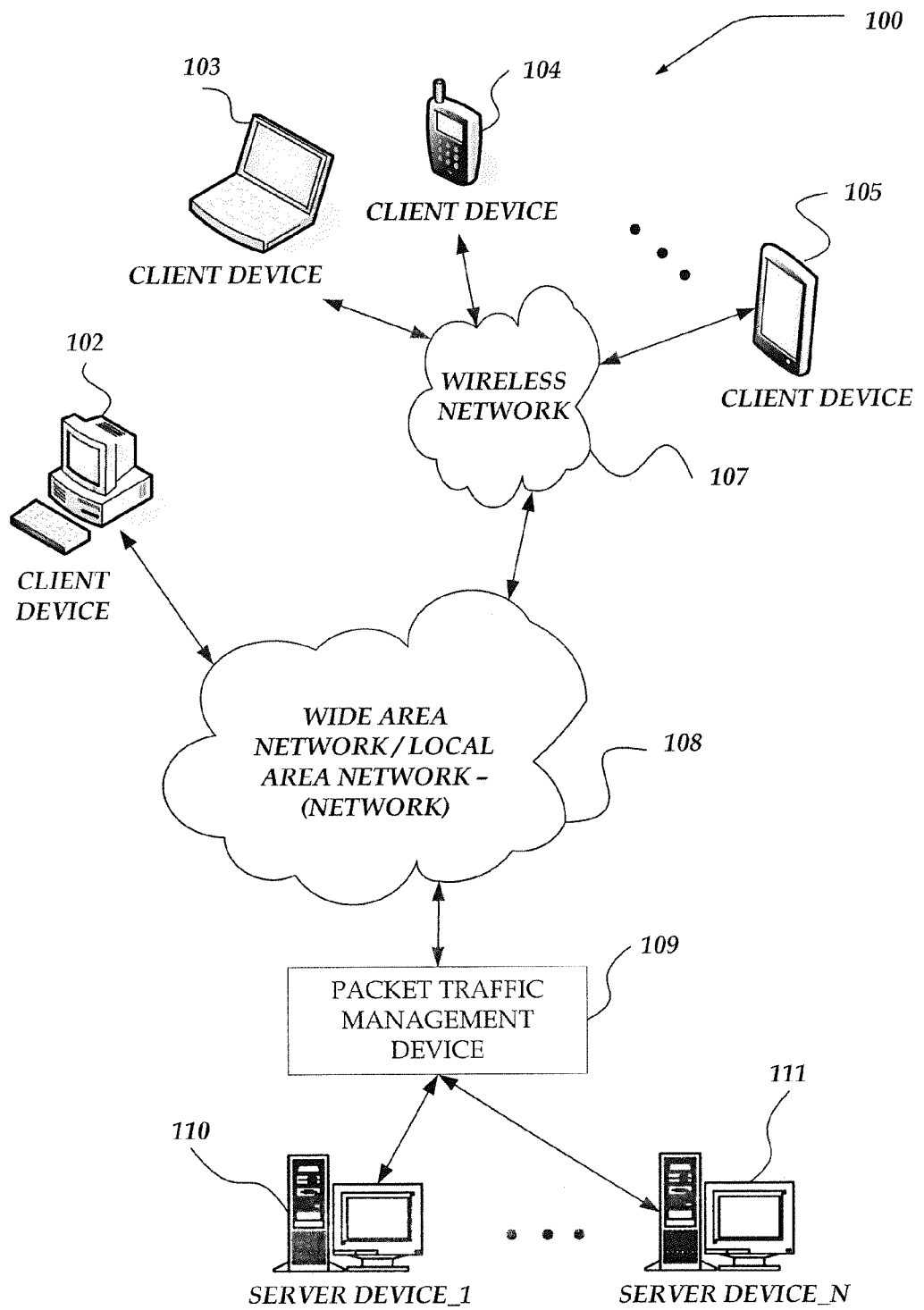
FIG. 1 illustrates an overview of a system in which various embodiments may be practiced.

Various embodiments now will be described more fully hereinafter with reference to the accompanying drawings, which form a part hereof, and which show, by way of illustration, specific illustrative embodiments. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase ""in at least one of the various embodiments"" as used herein does not necessarily refer to the same embodiment, though it may. Furthermore, the phrase ""in another embodiment"" as used herein does not necessarily refer to a different embodiment, although it may. Thus, as described below, various embodiments may be readily combined, without departing from the scope or spirit of the claimed subject matter.

In addition, as used herein, the term ""or"" is an inclusive ""or"" operator, and is equivalent to the term ""and/or,"" unless the context clearly dictates otherwise. The term ""based on"" is not exclusive and allows for being based on additional factors not described, unless the context clearly dictates otherwise. In addition, throughout the specification, the meaning of ""a,"" ""an,"" and ""the"" include plural references. The meaning of ""in"" includes ""in"" and ""on.""

For example embodiments, the following terms are also used herein according to the corresponding meaning, unless the context clearly dictates otherwise.

The term ""Diameter"", ""Diameter Protocol"" as used herein refers to a communication and message exchange protocol based on RFC 3588. (See, Network Working Group Request For Comments (RFC) 3588.) The Diameter protocol supports user/application data fields called ""attribute-value pairs"" (AVP's). Diameter messages may be arranged such that one or more AVP fields may be appended to a Diameter message.

Briefly stated various embodiments may be directed towards enabling one or more load balance servers to maintain connection flow persistence if the server initiates to the communication to a client. A packet traffic management device may (PTMD) intercept the request from the server and generate reverse persistence information. The PTMD may include a portion of the reverse persistence information in the request before forwarding the request to the targeted client device.

In at least one of the various embodiments, if the targeted client device responds to the request sent by the server, the client device may send the response to the PTMD. In at least one of the various embodiments, the PTMD may employ the reverse persistence information to identify the target server (e.g., the server that initiated the communication session with client).

In at least one of the various embodiments, if a server may be determined, the PTMD may remove the reverse persistence information from the response sent by the client and forward the response to the determined server. In at least one of the various embodiments, removing the reverse persistence information may remove evidence that the PTMD intervened in the connection between the client and server."

In at least one of the various embodiments, network devices and/or applications running on the network devices may use peer-to-peer communication protocols. In at least one of the various embodiments, peer-to-peer protocols may diverge away from a traditional client-server relationship between participants. Also, in at least one of the various embodiments, some peer-to-peer to protocols may employ one or more discovery mechanisms to locate and identify peers. Generally, in at least one of the various embodiments, peers within a peer-to-peer network may initiate communication exchanges with other peers in the network. Thus, in peer-to-peer networks the traditional client-server hierarchy may break down. Likewise, in the discussions below the role of client and server are used as a convenience to clarify the description. The servers are initiating a request and the clients are responding to requests.

Furthermore, in at least one of the various embodiments, communication protocols, including peer-to-peer protocols such as Diameter, may exchange multiple messages that may be characterized as a session. In at least one of the various embodiments, a session may be employed by the communication protocol to define a conversation between conversation endpoint devices that may include multiple messages. For purposes of at least one of the various embodiments described herein, during sessions/communication exchanges an endpoint device may play the role of a server if sending requests and likewise the same endpoint device may play the role of a client if responding to the requests.

Illustrative Operating Environment

FIG. 1 shows components of one embodiment of an environment in which the invention may be practiced. Not all of the components may be required to practice the various embodiments, and variations in the arrangement and type of the components may be made without departing from the spirit or scope of the claimed subject matter.

As shown, system 100 of FIG. 1 includes local area networks ("LANs")/wide area networks ("WANs")—(network) 108, wireless network 107, client devices 102-105, packet traffic management device ("PTMD") 109, and server devices 110-111. Network 108 is in communication with and enables communication between client devices 102-105, wireless network 107, and PTMD 109. Wireless network 107 further enables communication with wireless devices, such as client devices 103-105. PTMD 109 is in communication with network 108 and server devices 110-111.

One embodiment of client devices 102-105 is described in more detail below in conjunction with FIG. 2. In one embodiment, at least some of client devices 102-105 may operate over a wired and/or a wireless network, such as networks 107 and/or 108. Generally, client devices 102-105 may include virtually any computing device capable of communicating over a network to send and receive information, including instant messages, performing various online activities, or the like. It should be recognized that more or less client devices may be included within a system such as described herein, and embodiments are therefore not constrained by the number or type of client devices employed.

Devices that may operate as client device 102 may include devices that typically connect using a wired or wireless communications medium, such as personal computers, servers, multiprocessor systems, microprocessor-based or programmable consumer electronics, network PCs, or the like. In some embodiments, client devices 102-105 may include virtually any portable computing device capable of connecting to another computing device and receiving information, such as laptop computer 103, smart phone 104, tablet computer 105, or the like. However, portable computer devices are not so limited and may also include other portable devices, such as cellular telephones, display pagers, radio frequency ("RF") devices, infrared ("IR") devices, Personal Digital Assistants ("PDAs"), handheld computers, wearable computers, integrated devices combining one or more of the preceding devices, and the like. As such, client devices 102-105 typically range widely in terms of capabilities and features. Moreover, client devices 102-105 may provide access to various computing applications, including a browser, or other web-based applications.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages ("WAP"), and the like. In one embodiment, the browser application is enabled to employ Handheld Device Markup Language ("HDML"), Wireless Markup Language ("WML"), WMLScript, JavaScript, Standard Generalized Markup Language ("SGML"), HyperText Markup Language ("HTML"), eXtensible Markup Language ("XML"), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send data between another computing device. The client application may include a capability to send and/or receive content, or the like. The client application may further provide information that identifies itself, including a type, capability, name, or the like. In one embodiment, client devices 102-105 may uniquely identify themselves through any of a variety of mechanisms, including a phone number, Mobile Identification Number ("MIN"), an electronic serial number ("ESN"), or other mobile device identifier. The information may also indicate a content format that the mobile device is enabled to employ. Such information may be provided in a network packet, or the like, sent between other client devices, PTMD 109, server devices 110-111, or other computing devices.

Client devices 102-105 may further be configured to include a client application that enables an end-user to log into an end-user account that may be managed by another computing device, such as server devices 110-111, or the like. Such end-user account, in one non-limiting example, may be configured to enable the end-user to manage one or more online activities, including in one non-limiting example, search activities, social networking activities, browse various websites, communicate with other users, participate in gaming, interact with various applications, or the like. However, participation in online activities may also be performed without logging into the end-user account.

Wireless network 107 is configured to couple client devices 103-105 and its components with network 108. Wireless network 107 may include any of a variety of wireless sub-networks that may further overlay stand-alone ad-hoc networks, and the like, to provide an infrastructure-oriented connection for client devices 102-105. Such sub-networks may include mesh networks, Wireless LAN ("WLAN") networks, cellular networks, and the like. In one embodiment, the system may include more than one wireless network.

Wireless network 107 may further include an autonomous system of terminals, gateways, routers, and the like connected by wireless radio links, and the like. These connectors may be configured to move freely and randomly and organize themselves arbitrarily, such that the topology of wireless network 107 may change rapidly.

Wireless network 107 may further employ a plurality of access technologies including 2nd (2G), 3rd (3G), 4th (4G) $5^{th}$ (5G) generation radio access for cellular systems, WLAN, Wireless Router ("WR") mesh, and the like. Access technologies such as 2G, 3G, 4G, 5G, and future access networks may enable wide area coverage for mobile devices, such as client devices 103-105 with various degrees of mobility. In one non-limiting example, wireless network 107 may enable a radio connection through a radio network access such as Global System for Mobil communication ("GSM"), General Packet Radio Services ("GPRS"), Enhanced Data GSM Environment ("EDGE"), code division multiple access ("CDMA"), time division multiple access ("TDMA"), Wideband Code Division Multiple Access ("WCDMA"), High Speed Downlink Packet Access ("HSDPA"), Long Term Evolution ("LTE"), and the like. In essence, wireless network 107 may include virtually any wireless communication mechanism by which information may travel between client devices 103-105 and another computing device, network, and the like.

Network 108 is configured to couple network devices with other computing devices, including, server devices 110-111 through PTMD 109, client device 102, and client devices 103-105 through wireless network 107. Network 108 is enabled to employ any form of computer readable media for communicating information from one electronic device to another. Also, network 108 can include the Internet in addition to LANs, WANs, direct connections, such as through a universal serial bus ("USB") port, other forms of computer readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks ("ISDNs"), Digital Subscriber Lines ("DSLs"), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 108 may be configured to transport information of an Internet Protocol ("IP"). In essence, network 108 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of PTMD 109 is described in more detail below in conjunction with FIG. 3. Briefly, however, PTMD 109 may include virtually any network device capable of managing network traffic between client devices 102-105 and server devices 110-111. Such devices include, for example, switches, routers, proxies, firewalls, load balancers, cache devices, devices that perform network address translation, or the like, or any combination thereof. PTMD 109 may perform the operations of routing, translating, switching packets, or the like. In one embodiment, PTMD 109 may inspect incoming network packets, and may perform an address translation, port translation, a packet sequence translation, and the like, and route the network packets based, at least in part, on the packet inspection. In some embodiments, PTMD 109 may perform load balancing operations to determine a server device to direct a request. Such load balancing operations may be based on network traffic, network topology, capacity of a server, content requested, or a host of other traffic distribution mechanisms.

PTMD 109 may receive requests from servers attempting to establish a session and/or a connection with a client device. PTMD 109 may inspect the network packets comprising the server request and may perform an address translation, port translation, a packet sequence translation, or the like, and route the network packets to the targeted client device based, at least in part, on the packet inspection, perform translation between client devices, such as client devices 102-105, and server devices, such as server devices 110-111. In at least one of the various embodiments, PTMD 109 may insert data into the outgoing request from the server that may enable PTMD 109 to ensure that if the client device responds to the server request the response may forwarded by PTMD 109 to the appropriate server.

Server devices 110-111 may include virtually any network device that may operate as a website server. However, server devices 110-111 are not limited to website servers, and may also operate as messaging server, a File Transfer Protocol (FTP) server, a database server, content server, or the like. Additionally, each of server devices 110-111 may be configured to perform a different operation. Devices that may operate as server devices 110-111 include various network devices, including, but not limited to personal computers, desktop computers, multiprocessor systems, microprocessor-based or programmable consumer electronics, network PCs, server devices, network appliances, and the like.

Although FIG. 1 illustrates server devices 110-111 as single computing devices, the embodiments are not so limited. For example, one or more functions of each of server devices 110-111 may be distributed across one or more distinct network devices. Moreover, server devices 110-111 are not limited to a particular configuration. Thus, in one embodiment, server devices 110-111 may contain a plurality of network devices that operate using a master/slave approach, where one of the plurality of network devices of server devices 110-111 operate to manage and/or otherwise coordinate operations of the other network devices. In other embodiments, the server devices 110-111 may operate as a plurality of network devices within a cluster architecture, a peer-to-peer architecture, and/or even within a cloud architecture. Thus, the at least one of the various embodiments is not to be construed as being limited to a single environment, and other configurations, and architectures are also envisaged.

Figure 2:
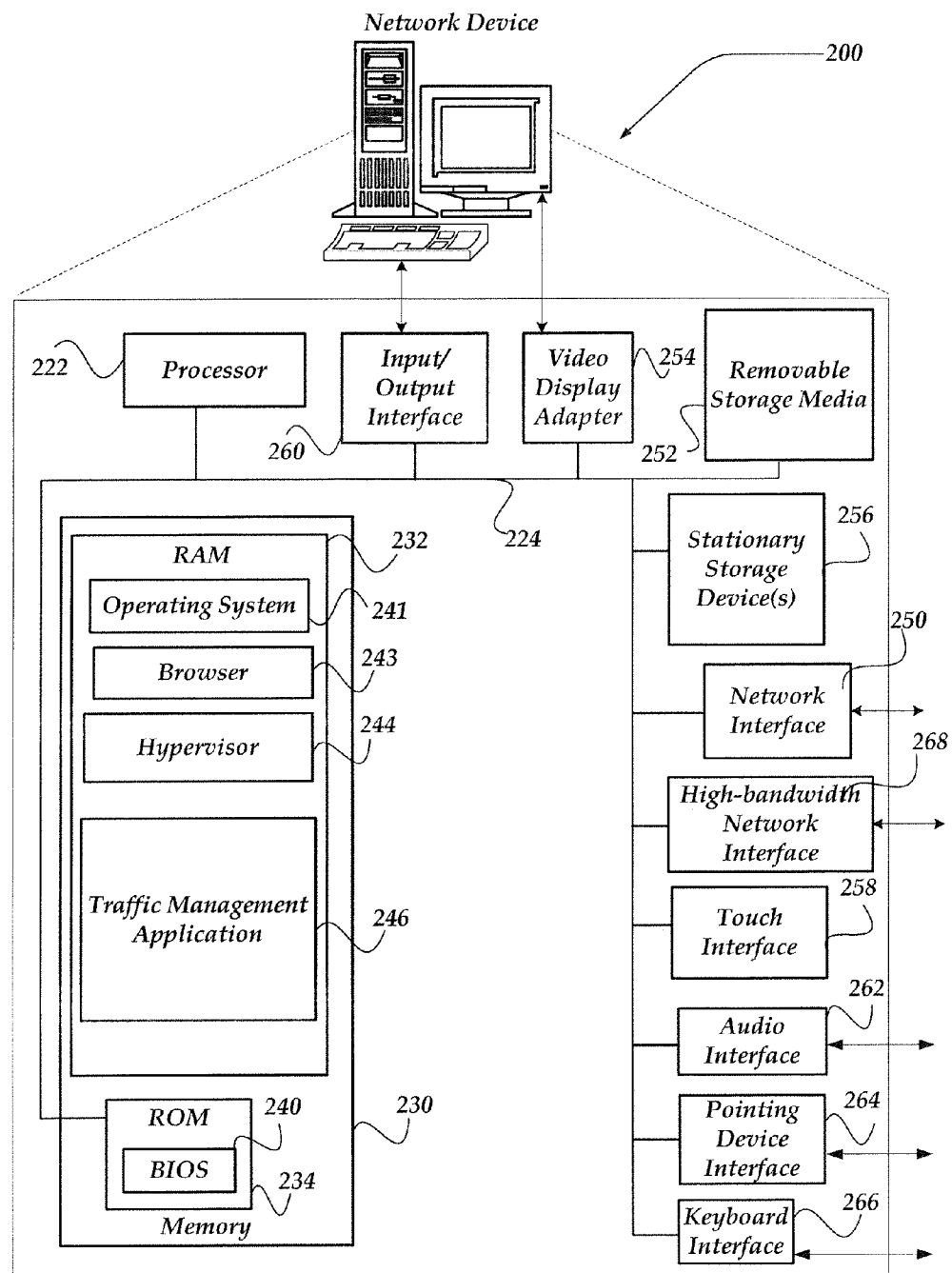
FIG. 2 shows a network device in accordance with the various embodiments.

FIG. 2 shows one embodiment of a network device, according to at least one of the embodiments. Network device 200 may include many more, or fewer, components than those shown. The components shown, however, are sufficient to disclose an illustrative embodiment. Network device 200 may represent, for example, PTMD 109 of FIG. 1.

As shown in FIG. 2, network device 200 includes processor 222 in communication with mass memory 230 via bus 224. Mass memory 230 may include RAM 232, ROM 234, and other memory storage means. Mass memory 230 illustrates an example of computer readable storage media for storage of data such as computer readable instructions, data structures, program modules or other data. Mass memory stores a basic input/output system ("BIOS") 240 for controlling low-level operation of network device 200. The mass memory also stores an operating system 241 for controlling the operation of network device 200. It should be appreciated that this component may include a general purpose operating system such as a version of Windows®, UNIX, or LINUX®, or a specialized mobile communication operating system such as Apple iOS®, Google Android®, Windows Mobile™, the Symbian® operating system, or the like. The operating system may include, or interface with a Java® virtual machine module that enables control of hardware components and/or operating system operations via Java application programs.

Memory 230 can be utilized by network device 200 to store programs, applications, software modules, and the like, as well as the data used by such programs, applications, and/or software modules. Applications may comprise processor executable instructions which can be executed by network device 200. Programs in mass memory 230 may include a browser application 243. Browser 243 may run under the control of operating system 241 to transmit, receive, render, and/or otherwise process documents of various formats (e.g. PDF, Word, Excel, and the like), markup pages such as HTML pages, XML pages, WAP pages (sometimes referred to as WAP cards), and the like, and/or multimedia content (e.g., audio, video, graphics), and any other form of content deliverable over the web. Mass memory 230 may also include Hypervisor 244 which may manage virtual machines and guest applications that may be executing on the network device. Memory 230 may further include Traffic Management Application 246, which may perform actions such as receiving requests from servers attempting to establish a session and/or a connection with a client device. In at least one of the various embodiments, Traffic Management Application 246 may inspect the network packets comprising a server request and may perform an address translation, port translation, a packet sequence translation, or the like, and route the network packets to the targeted client device based, at least in part, on the packet inspection, perform translation between client devices and server devices in accordance with at least one of the various embodiments.

Furthermore, in at least one of the various embodiments, Traffic Management Application 246 may intercept one or more messages from one or more servers that may be targeted at clients. In at least one of the various embodiments, Traffic Management Application 246 may generate reverse persistence information and include it in network packets and/or messages that may be forwarded to clients. Also, in at least one of the various embodiments, Traffic Management Application 246 remove reverse persistence information from a response message sent by a client before forwarding the message to the targeted server.

Mass memory 230 may also include other applications that are not shown. Other examples of applications include content management applications, messaging applications, schedulers, calendars, web services, transcoders, database programs, word processing programs, spreadsheet programs, and so forth. Accordingly, some of these applications may process images, audio, video, or markup pages, enable telecommunication with another user of another electronic device, and/or other services.

Network device 200 also includes an input/output interface 260 for communicating with input/output devices such as a Joystick, wheel, rocker switches, keypad, printer, scanner, modem, video camera, modem, and/or other input devices not specifically shown in FIG. 2. A user of network device 200 can use input/output devices to interact with a user interface that may be separate or integrated with operating system 241, and/or programs in memory 230. Interaction with the user interface includes visual interaction via a display coupled to video display adapter 254. The user interface can also include gesture interface 270, touch interface 258, pointing device interface 264, keyboard interface 266, and audio interface 262.

Network device 200 may include removable storage media 252 and stationary storage device(s) 256. Removable storage media 252 can comprise one or more of an optical disc drive, flash memory drive, hard drive, a floppy disk drive, tape drive, and/or any other type of processor readable non-transitory storage media. Stationary storage device 256 or removable storage media 252 may include any method or technology for processor readable non-volatile storage of data, such as processor readable instructions, data structures, program modules, text, or other data. Examples of processor readable non-volatile storage media include a CD-ROM, digital versatile disks (DVD) or other optical storage, magnetic cassettes, magnetic tape, magnetic disk storage or other magnetic storage devices, RAM, ROM, EEPROM, flash memory, flash drives or other memory technology, hard disk drives, or any other media which can be used to store data that can be accessed by a computing device.

Via a network communication interface unit 250, network device 200 can communicate with a communication protocol, such as Ethernet and the like, with a wide area network such as the Internet, Cloud Network, a local area network, a wired telephone network, a cellular telephone network, or some other communications network, such as networks 120 and/or carrier network 130 in FIG. 1. Additionally, high bandwidth network interface 268 is provided to enable network device 200 to communicate with other co-located network devices at vastly greater speeds than network interface 250. For example, network device 200 may be physically embodied on a "blade" or card in a chassis that supports the operation of several co-located blades and provides access to a high bandwidth network backplane for the network devices to communicate particular information between each other over high bandwidth network interface 268.

Figure 3:
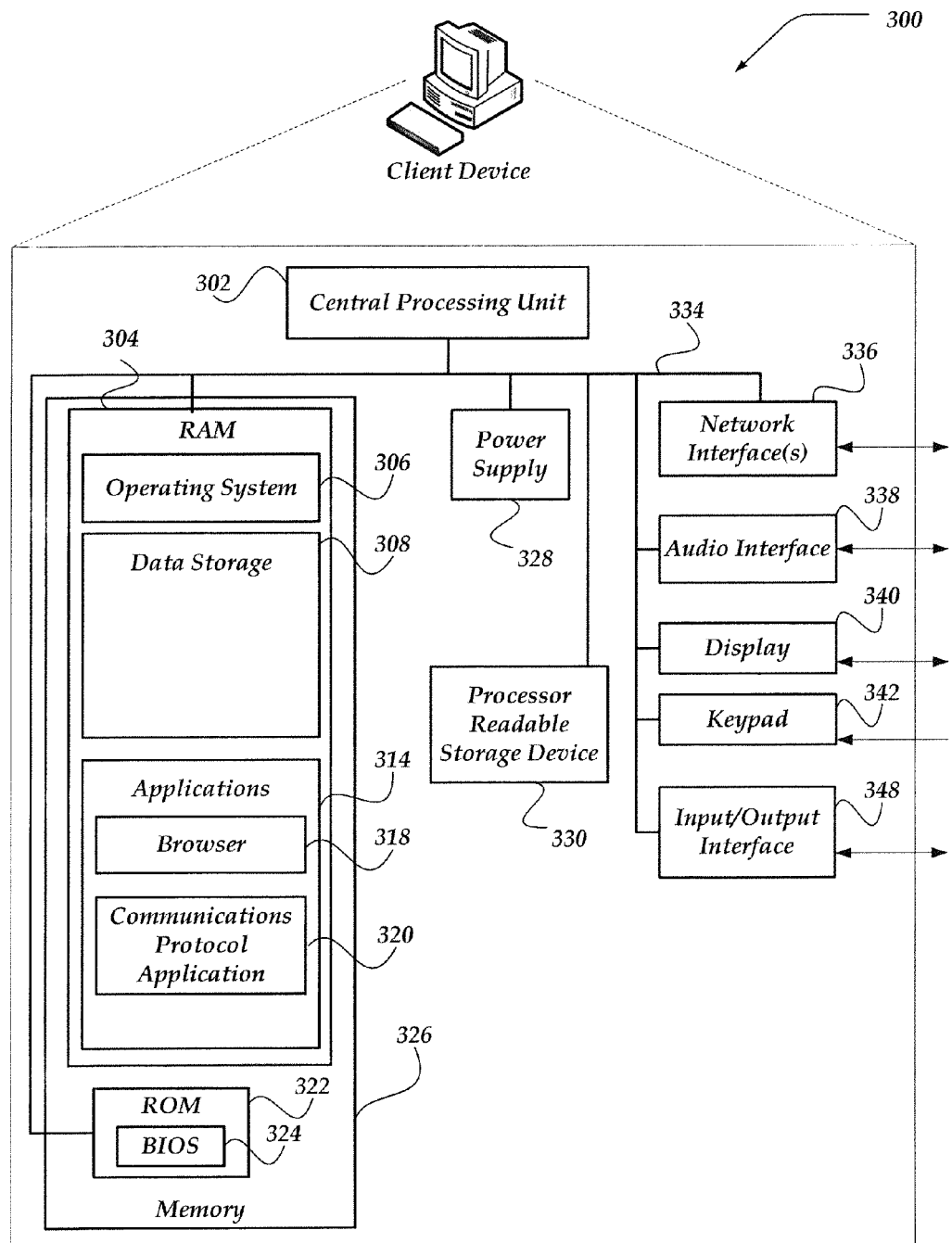
FIG. 3 shows a client device in accordance with the various embodiments.

FIG. 3 shows one embodiment of client device 300 that may be included in a system implementing at least one of the various embodiments. In at least one of the various embodiments, a user may employ client device 300 to receive requests from servers and to respond to requests from servers PTMD 109. Client device 300 may include many more or less components than those shown in FIG. 3. However, the components shown are sufficient to disclose an illustrative embodiment for practicing the present embodiments. Client device 300 may represent, for example, one embodiment of at least one of client devices 102-105 of FIG. 1.

As shown in the figure, client device 300 includes a central processing unit ("CPU") 302 in communication with a mass memory 326 via a bus 334. Client device 300 also includes a power supply 328, one or more network interfaces 336, an audio interface 338, a display 340, a keypad 342, and an input/output interface 348. Power supply 328 provides power to client device 300. A rechargeable or non-rechargeable battery may be used to provide power. The power may also be provided by an external power source, such as an AC adapter or a powered docking cradle that supplements and/or recharges a battery.

Client device 300 may optionally communicate with a base station (not shown), or directly with another computing device. Network interface 336 includes circuitry for coupling client device 300 to one or more networks, and is constructed for use with one or more communication protocols and technologies including, but not limited to, global system for mobile communication ("GSM"), code division multiple access ("CDMA"), time division multiple access ("TDMA"), user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("Wi-Max"), session initiated protocol/real-time transport protocol ("SIP/RTP"), or any of a variety of other wireless communication protocols. Network interface 336 is sometimes known as a transceiver, transceiving device, or network interface card ("NIC").

Audio interface 338 is arranged to produce and receive audio signals such as the sound of a human voice. For example, audio interface 338 may be coupled to a speaker and microphone (not shown) to enable telecommunication with others and/or generate an audio acknowledgement for some action. Display 340 may be a liquid crystal display ("LCD"), gas plasma, light emitting diode ("LED"), or any other type of display used with a computing device. Display 340 may also include a touch sensitive screen arranged to receive input from an object such as a stylus or a digit from a human hand.

Keypad 342 may comprise any input device arranged to receive input from a user. For example, keypad 342 may include a push button numeric dial, or a keyboard. Keypad 342 may also include command buttons that are associated with selecting and sending images.

Client device 300 also comprises input/output interface 348 for communicating with external devices, such as a headset, or other input or output devices not shown in FIG. 3. Input/output interface 348 can utilize one or more communication technologies, such as USB, infrared, Bluetooth™, or the like.

Mass memory 326 includes a Random Access Memory ("RAM") 304, a Read-only Memory ("ROM") 322, and other storage means. Mass memory 326 illustrates an example of computer readable storage media (devices) for storage of information such as computer readable instructions, data structures, program modules or other data. Mass memory 326 stores a basic input/output system ("BIOS") 324 for controlling low-level operation of client device 300. The mass memory also stores an operating system 206 for controlling the operation of client device 300. It will be appreciated that this component may include a general-purpose operating system such as a version of UNIX, or LINUX™, or a specialized client communication operating system such as Windows Mobile™, Google Android™, Apple iOS™, or the Symbian® operating system. The operating system may include, or interface with a Java virtual machine module that enables control of hardware components and/or operating system operations via Java application programs.

Mass memory 326 further includes one or more data storage 308, which can be utilized by client device 300 to store, among other things, applications 314 and/or other data. For example, data storage 308 may also be employed to store information that describes various capabilities of client device 300. The information may then be provided to another device based on any of a variety of events, including being sent as part of a header during a communication, sent upon request, or the like. At least a portion of the information may also be stored on a disk drive or other computer-readable storage device (not shown) within client device 300. In some embodiments, data storage 308 may include a database, text, spreadsheets, folders, files, or the like.

Applications 314 may include computer executable instructions which, when executed by client device 300, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 314 may include, for example, browser 318.

Browser 318 may include virtually any application configured to receive and display graphics, text, multimedia, and the like, employing virtually any web based language. In one embodiment, the browser application is enabled to employ HDML, WML, WMLScript, JavaScript, SGML, HTML, XML, and the like, to display and send a message. However, any of a variety of other web-based languages may be employed. In one embodiment, browser 318 may enable a user of client device 300 to communicate with another network device, such as PTMD 109 of FIG. 1. In one embodiment, browser 318 may enable a user to view and/or make requests on servers that may be managed by PTMD 109, or the like.

Communications Protocol Application 320 may receive requests from server and generate responses. Received requests that may include reverse persistence information may be processed in accordance with one or more operative communication protocols. In at least one of the various embodiments, Communications Protocol Application 320 may exchange messages with other client devices and/or network devices. In at least one of the various embodiments, Communications Protocol Application 320 may play the role of a server and generate request messages and/or at other times it may play the role of a client and receive request messages from one or more servers.

Generalized Operation

Figure 4A:
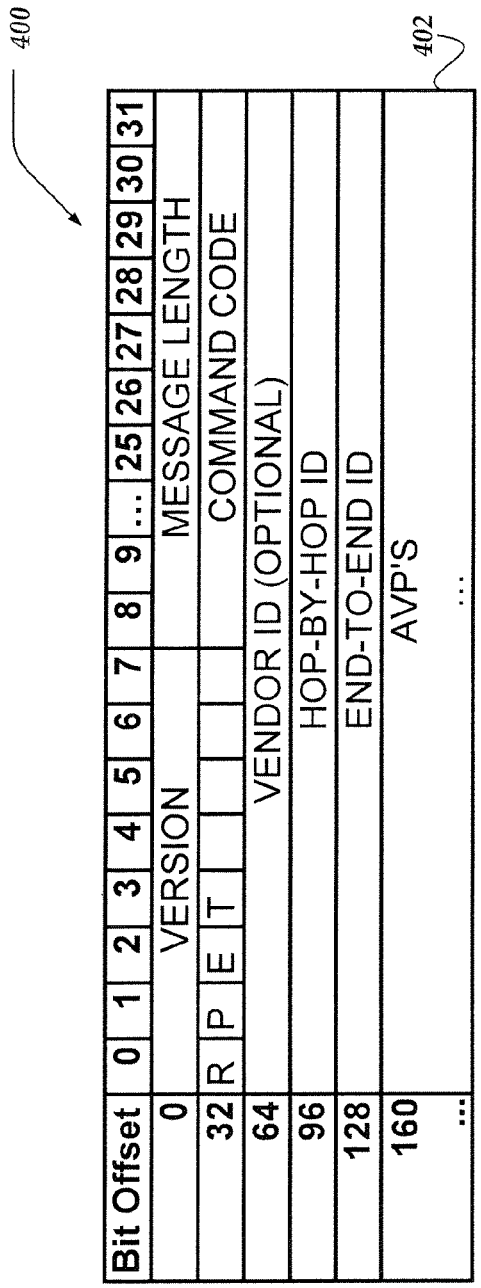
FIGS. 4A-4B illustrates a message protocol format in accordance with at least one of the various embodiments.

FIG. 4A illustrates message protocol header 400 that may be used in at least one of the various embodiments. In at least one of the various embodiments, one or more message protocols may be used by server devices 110-111 to communicate with client devices 102-105.

In at least one of the various embodiments, header format 400 may be used for communication and message exchange based on the Diameter protocol. (See, Network Working Group Request For Comments (RFC) 3588.) In at least one of the various embodiments, the Diameter protocol may support user/application data fields called "attribute-value pairs" (AVP's). In at least one of the various embodiments, Diameter messages may be arranged such that one or more AVP fields 402 may be appended to a Diameter message.

Figure 4B:
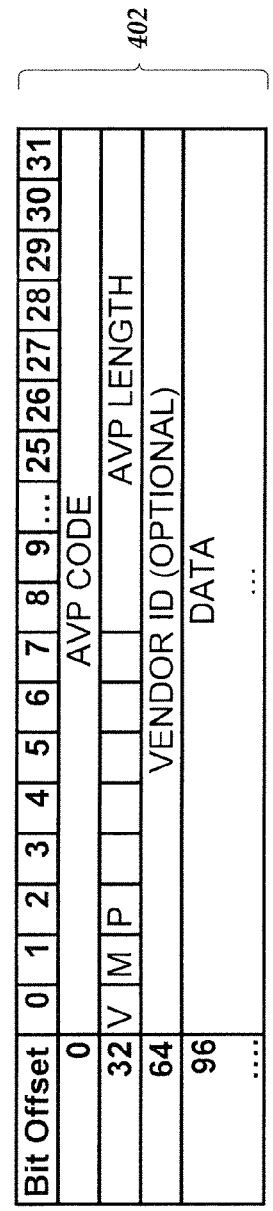

FIG. 4B illustrates for at least one of the various embodiments, Diameter AVP message format 402. In at least one of the various embodiments, an AVP message type of PROXY-INFO may be employed by clients and/or servers to exchange routing information between clients/servers that may be participants in a Diameter communication. In at least one of the various embodiments, AVP's may be arranged such that the Diameter client that receives a PROXY-INFO AVP may return that same AVP (or at least the same contents of the received PROXY-INFO AVP) if it responds to the received message.

In at least one of the various embodiments, portions of reverse persistence information generated by a PTMD may be stored AVP's that are received by clients. In at least one of the various embodiments, PROXY-INFO AVP(s) may be employed by a PTMD to store portions of reverse persistence information used in communication exchanges where Diameter is the operative communications protocol.

Figure 5:
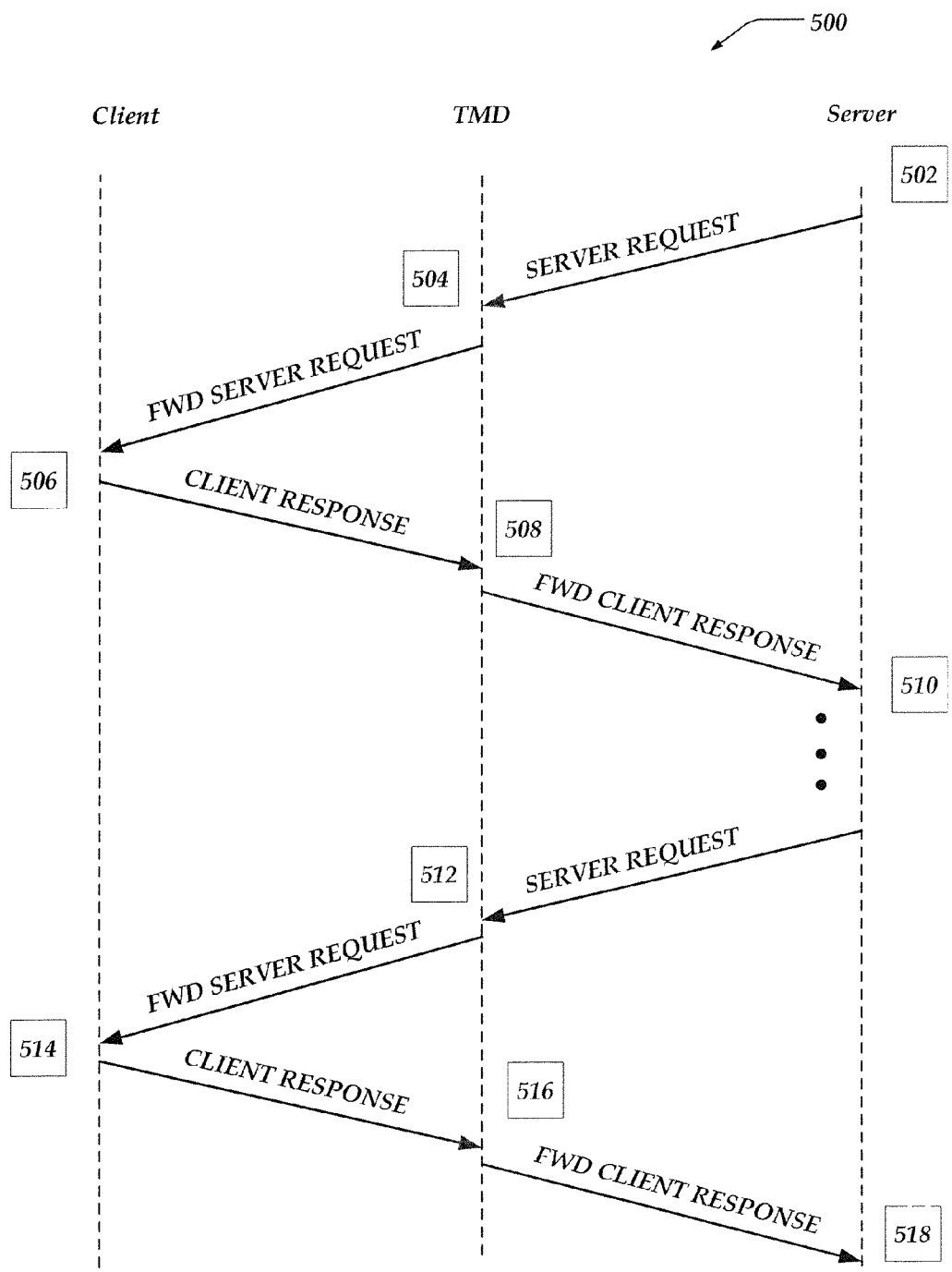
FIG. 5 illustrates a sequence diagram generally showing a request-response sequence in accordance with the embodiments.

FIG. 5 illustrates a sequence diagram generally showing a request-response sequence in accordance with the embodiments. In at least one of the various embodiments, at step 502, a server may initiate a request that may be directed towards a particular client device. In at least one of the various embodiments, the server may be configured using standard network management/configuration tools (e.g., routing tables, default gateways, or the like) so that outbound network traffic directed towards client devices may go through a PTMD, such as PTMD 109.

In at least one of the various embodiments, if Diameter is the operative communication protocol for exchanges between the client(s) and server(s), a network protocol of Transmission Control Protocol (TCP) and/or Stream Control Transmission Protocol (SCTP) may employed by the PTMD to exchange the network packets that comprise to the communication. In at least one of the various embodiments, other communication protocols may use the same or other well-known network protocols.

At step 504, in at least one of the various embodiments, the request from the server may be intercepted by the PTMD. In at least one of the various embodiments, the PTMD may generate reverse persistence information that may include a unique session identifier that at least corresponds to the server that sent the request. Further, in at least one of the various embodiments, the PTMD may include the reverse persistence information in the request and then forward the request to the client device. Also, in at least one of the various embodiments, the PTMD may preserve the network identity of the requesting server and associate it with the generated unique identifier. The link/association between the session identifier and the network identity of the server may be stored and/or cached at the PTMD. In at least one of the various embodiments, if the PTMD is finished processing the request, the request may be forwarded to the targeted client device.

At step 506, in at least one of the various embodiments, the client device may receive the request forwarded by the PTMD. In at least one of the various embodiments, the client device may perform one or more tasks responsive to the request. In at least one of the various embodiments, if received request requires and/or initiates a response from the client device, it may send a response directed towards the server that may have initiated the request. In at least one of the various embodiments, the response message from the client may include at least the portions of generated reverse persistence information that may have been added to the request by the PTMD.

At step 508, in at least one of the various embodiments, the PTMD may receive the response from the client. In at least one of the various embodiments, the PTMD may parse the received response and acquire the portions of the generated reverse persistence information that may have been sent to the client in the request. In at least one of the various embodiments, using the reverse persistence information, the PTMD may retrieve the information identifying the server that originated the requests (e.g., stored during step 502). In at least one of the various embodiments, if the appropriate server may be determined, the PTMD may forward the response from the client to the appropriate server.

In at least one of the various embodiments, the PTMD may remove the portions of the generated reverse persistence information the response, or otherwise transform the response to remove evidence of the PTMD's intervention in the communication exchange from the response. For example, in at least one of the various embodiments, if the response includes fields or values that indicate that the destination for the response was the PTMD, the PTMD may replace those fields with information that corresponds to the server that originated the request.

At step 510, in at least one of the various embodiments, the server may receive the response from the client. In at least one of the various embodiments, as communication between the server and client continues, the sequence may be repeated as illustrated by steps 512-518 until the session may be completed.

Figure 6:
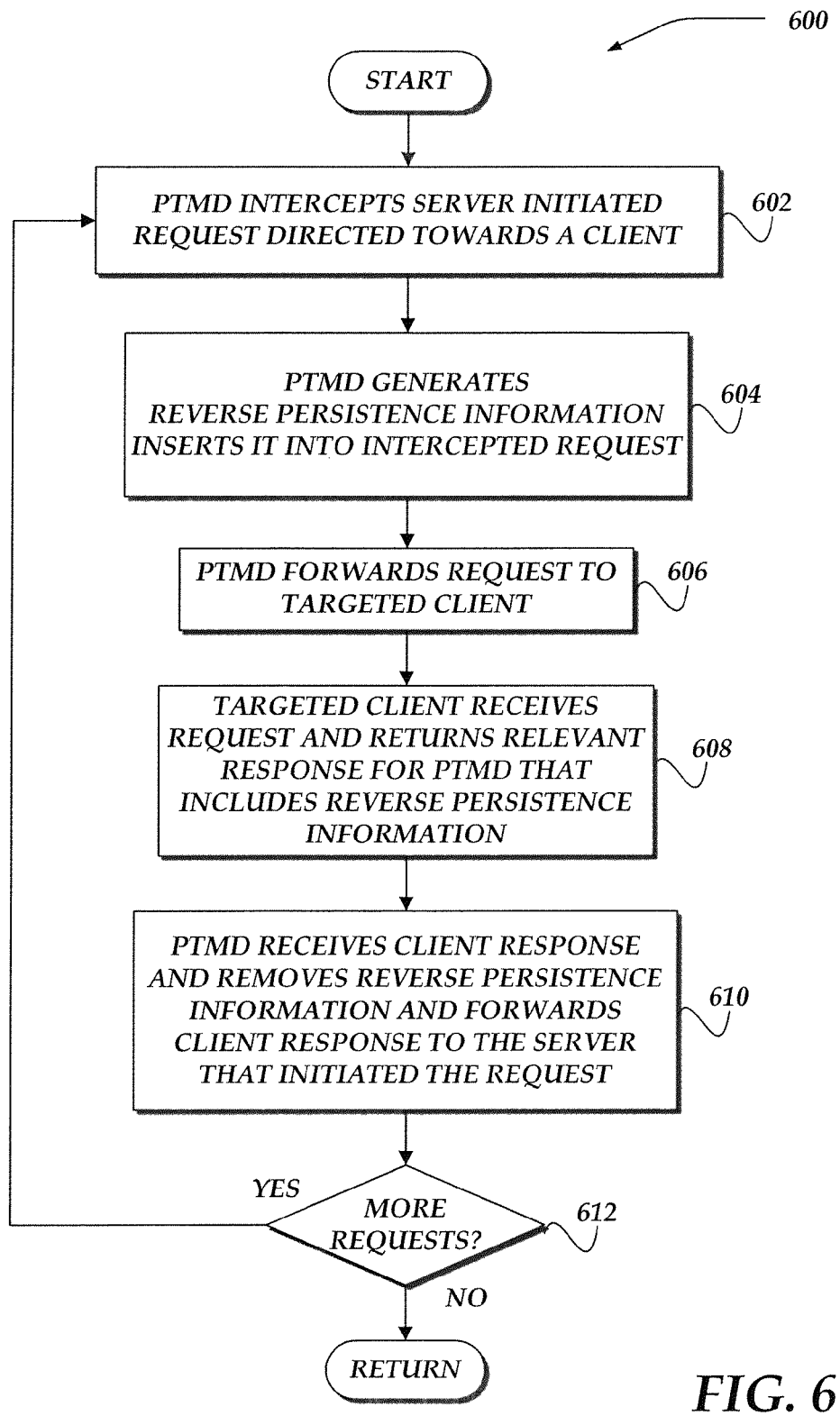
FIG. 6 shows an overview flowchart for a process for reverse persistence in accordance with at least one of the various embodiments.

FIG. 6 shows an overview flowchart for process 600 for reverse persistence in accordance with at least one of the various embodiments. After a start block, at block 602, in at least one of the various embodiments, a PTMD may intercept a request message sent over a network by a server directed to a client.

In at least one of the various embodiments, the request message sent by the server may include information sufficient to identify the targeted client. In at least one of the various embodiments, if the server may be sending a request using the Diameter protocol, the client information may be included in the Destination-Host AVP of the intercepted message, or the like.

In at least one of the various embodiments, the message intercepted by the PTMD may comprise one or more network packets. Thus, in at least one of the various embodiments, the PTMD may receive multiple network packets associated with same request message before processing the request message.

At block 604, in at least one of the various embodiments, the PTMD may generate reverse persistence information and modifying the intercepted request message.

In at least one of the various embodiments, the generated reverse persistence information may include an identifier that at least may be used by the PTMD to determine which server initiated the request. In at least one of the various embodiments, such reverse persistence information may be selected such that the server that initiated the request may be determined. In at least one of the various embodiments, such information may include, server network address (e.g., internet protocol (IP) address, hostname, Media Access Control address (MAC address), or the like.

Additionally, in at least one of the various embodiments, the request message may be modified by adding a portion of the reverse persistence information into the request message. In at least one of the various embodiments, the modification of the request message may be arranged such that the added information does not interfere with the communication between the server and the client. For example, in at least one of the various embodiments, if the client and server are communicating using the Diameter communication protocol, the PTMD may add the reverse persistence information to the request message using Diameter's AVP mechanism (e.g., Proxy-Info, Origin-Host, or the like).

At block 606, in at least one of the various embodiments, the PTMD may forward the intercepted request message, including at least a portion of the generated reverse persistence information, to the targeted client device.

At block 608, in at least one of the various embodiments, the targeted client device may receive the request message. In at least one of the various embodiments, the targeted client may generate response relevant to the received request message returning it to the PTMD. In at least one of the various embodiments, the response message may include data that is responsive to the request from the server and it may include the reverse persistence information generated by the PTMD. For example, in at least one of the various embodiments, if the client and server may be using the Diameter protocol, the PTMD may have inserted the reverse persistence information into the message by adding a Proxy-Info AVP to the message. If Proxy-Info AVPs were added by the PTMD, in at least one of the various embodiments, the Diameter protocol may require that the same (or duplicate) Proxy-Info AVPs be included in the corresponding response message.

At block 610, in at least one of the various embodiments, the PTMD may receive the response message from the client device. Further, in at least one of the various embodiments, the PTMD may remove the reverse persistence information from the response message and forward the client device response message to the server that initiated the corresponding request message. In at least one of the various embodiments, removing the reverse persistence information from the client's response message may hide from the server that the PTMD intervened in the communication. In at least one of the various embodiments, this at least enables the PTMD to be transparent to the server. Thus, in at least one of the various embodiments, the server may remain oblivious to the intervention of the PTMD in the communication with the client.

In at least one of the various embodiments, the PTMD may be configured to leave a portion of the reverse persistence information in the messages sent by the client and directed to the server. Also, in at least one of the various embodiments, the PTMD may be configured to add other information to the client's response message before forwarding it on the server.

At decision block 612, in at least one of the various embodiments, if there may be more messages to intercept, control may loop back to block 602. Otherwise, in at least one of the various embodiments, control may be returned to a calling process.

Figure 7:
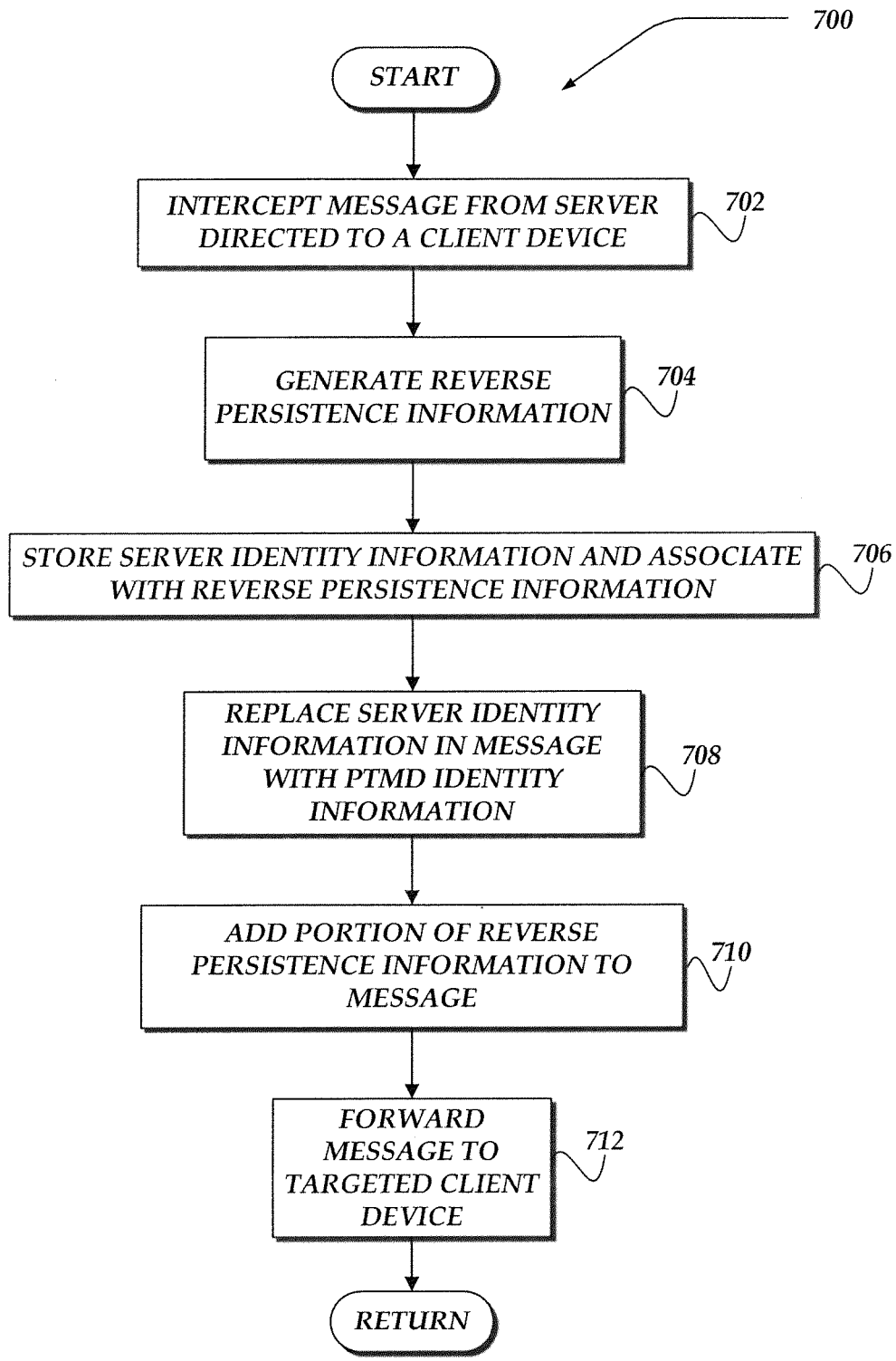
FIG. 7 shows an overview flowchart for a process for processing messages sent from server to a client in accordance with at least one of the various embodiments.

FIG. 7 shows an overview flowchart for process 700 for processing request messages at a PTMD that may be sent from server to a client in accordance with at least one of the various embodiments. After a start block, at block 702, in at least one of the various embodiments, a message originating from a server device and directed to a particular client device may be intercepted by the PTMD. In at least one of the various embodiments, the message intercepted by the PTMD may comprise one or more network packets. Thus, in at least one of the various embodiments, the PTMD may receive multiple network packets associated with same request message before processing the request message.

At block 704, in at least one of the various embodiments, the PTMD may generate reverse persistence information corresponding to the intercepted request message. In at least one of the various embodiments, reverse persistence information may include at least a unique session identifier that corresponds to the intercepted request message. Also, in at least one of the various embodiments, the reverse persistence information may include server identity information that may be used by the PTMD to later determine the server that initiated the request message.

At block 706, in at least one of the various embodiments, the PTMD may store the reverse persistence information and associate the server identity information with the session identifier.

In at least one of the various embodiments, the unique session identifier and/or server identifier may be generated based on one or more of the properties that may be associated with the request message, such as, characteristics of the server (e.g., network address, application port, or the like), targeted client characteristics, communication protocol being used, or the like.

In at least one of the various embodiments, the unique session identifier may be employed by the PTMD to identify and maintain the state that may be associated with the network connection that corresponds to the session. In at least one of the various embodiments the PTMD may cache sufficient information that may be employed to determine which received network packets may be associated with the response to the request message.

At block 708, in at least one of the various embodiments, the PTMD may replace the initiating server identity information that may be included with the intercepted request message with information that corresponds to the PTMD identity information.

In at least one of the various embodiments, replacing the server identification information with the PTMD information may enable the targeted client to send responses to the PTMD. In at least one of the various embodiments, fields and/or values within the request message may be modified such that client devices receiving the forwarded request message from the PTMD may be unaware of the network identify of the server that initiated the request message. In at least one of the various embodiments, the particular message fields and/or values that may be modified by the PTMD may vary depending on the communication protocol that may be in use over the connection.

For example, in at least one of the various embodiments, if the communication protocol being used is Diameter, AVPs used to identify the origin of a packet, such as, Origin-Host, Origin-Realm, Host-IP-Address, or the like, may be modified by the PTMD. In at least one of the various embodiments, the PTMD may replace the relevant fields with information directing the client to response directly to the PTMD. In at least one of the various embodiments, the PTMD may store the replaced server-identifying information for subsequent use.

At block 710, in at least one of the various embodiments, the PTMD may add a portion of the reverse persistence information to the network packet. In at least one of the various embodiments, the portion of reverse persistence information added to the request message may be sufficient to enable the client to send at least the session identifier information back to the PTMD if a response to the server's request message is sent.

In at least one of the various embodiments, the PTMD may be arranged to add the portion of the reverse persistence information based on the network/communication protocol that may be in use. For example, in at least one of the various embodiments, if the communication protocol Diameter is being used, the PTMD may add the portion of reverse persistence information to the request message using one or more AVPs, such as, Proxy-Info, or the like. Also, in at least one of the various embodiments, the PTMD may use vendor specific AVPs in accordance with the Diameter protocol.

At block 712, in at least one of the various embodiments, the PTMD may forward the request message to the targeted client device. In at least one of the various embodiments, if the request message has been modified to include sufficient reverse persistence information, the PTMD may forward the request message to the targeted client. Next, in at least one of the various embodiments, control may be returned to a calling process.

Figure 8:
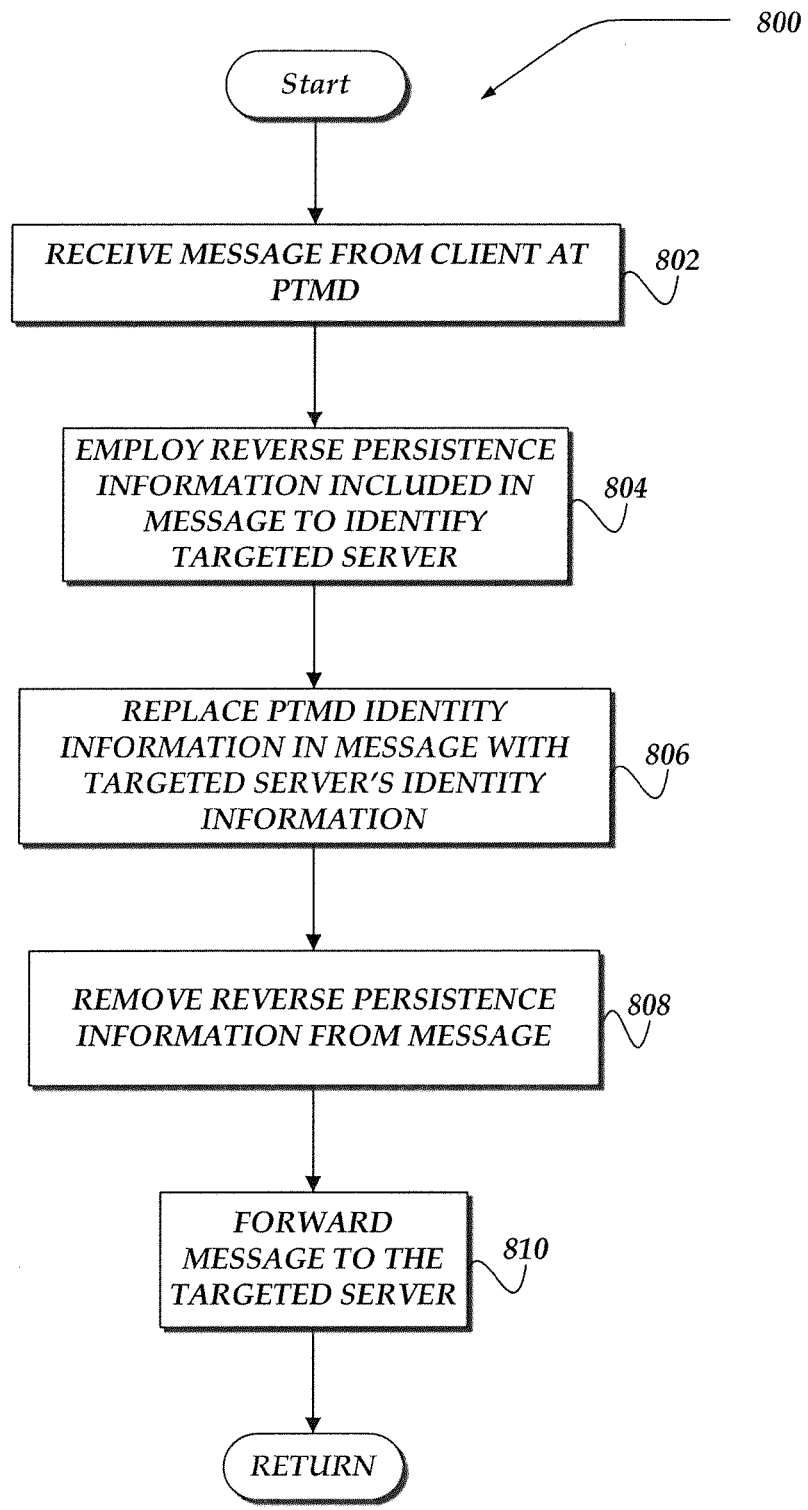
FIG. 8 shows an overview flowchart for a process for processing messages sent from a client to a server in accordance with at least one of the various embodiments.

FIG. 8 shows an overview flowchart for process 800 for processing response messages received at a PTMD that may have been sent from a client to a server in accordance with at least one of the various embodiments. After a start block, at block 802, in at least one of the various embodiments, the PTMD may receive one or more response messages from a client. In at least one of the various embodiments, a response message may be a message sent over a network to answer (respond) to a corresponding request message that may have been sent by a server.

In at least one of the various embodiments, a response message may be comprised of one or more network packets. In at least one of the various embodiments, the PTMD may receive and/or buffer network packets until an entire response message may be received.

At block 804, in at least one of the various embodiments, the PTMD may employ a portion of the reverse persistence information that may be included in the received response message to, identify the targeted server.

In at least one of the various embodiments, the reverse persistence information included in the response message may include a unique session identifier and/or a unique server identifier. In at least one of the various embodiments, the reverse persistence information may be included in one or more communication protocol specific fields. For example, in at least one of the various embodiments, if the Diameter communication protocol is being used, the reverse persistence information may be located in one or more AVPs, such as, Proxy-Info, or the like.

In at least one of the various embodiments, the PTMD may use well-known techniques such as hashing or encryption to sign a portion of the reverse persistence information, such as, as unique session identifier. In at least one of the various embodiments, signing a portion of the reverse persistence information may enable the PTMD to identify and/or validate relevant identifiers from among other identifiers that may be included in the received response message.

In at least one of the various embodiments, if the PTMD extracts a valid session identifier from the response message it may be used to retrieve information regarding the session and/or the server that initiated the communication session using a lookup table, cache, database, or the like.

At block 806, in at least one of the various embodiments, the PTMD may replace the PTMD identity information that may be included in the response message with the identity information that corresponds to the targeted server. In at least one of the various embodiments, the PTMD may restore the response message to a condition that conceals evidence of the PTMD's intervention into the communication between the server and client.

In at least one of the various embodiments, information sufficient to restore the response message may be stored on the PTMD and associated with a portion of the reverse persistence information (e.g., the unique session identifier). In at least one of the various embodiments, the actual fields and/or data is restored into the response message may vary depending on the operative communication protocol. In at least one of the various embodiments, the network identity information corresponding to the server that may be the source of message may be stored in lookup table, database, cache, or the like.

For example, in at least one of the various embodiments, if Diameter is the operative communication protocol, AVPs such as, Destination-Host, Destination-Realm, or the like may be modified to include information that corresponds to the targeted server rather than leaving in values associated with the PTMD.

At block 808, in at least one of the various embodiments, the PTMD may remove the reverse persistence information, including session identifier, from the response message. In at least one of the various embodiments, removing the reverse persistence information from the response message may enable the PTMD to conceal its intervention in the communication exchange from the server.

For example, in at least one of the various embodiments, if Diameter is the operative communication protocol, one or more AVPs such as, Proxy-Info, or the like, that may include at least a portion of the reverse persistence information may be removed from the response message before the message is forwarded to the targeted server.

At block 810, in at least one of the various embodiments, the PTMD may forward the response message to the targeted server. In at least one of the various embodiments, the targeted server may receive the response message from the PTMD. In at least one of the various embodiments, the targeted server may use its own session/connection identification mechanism to process the received response from the client. In at least one of the various embodiments, the reverse persistence processing, data modification, or PTMD generated session identifiers may be concealed from the server.

For example, in at least one of the various embodiments, if Diameter is the operative communication protocol, the server may rely on one or more AVPs, such as, Session-Id, Session-Timeout, or the like, independent from the reverse persistence information generated and/or employed by the PTMD. In at least one of the various embodiments, if the targeted server uses specific communication protocol fields that the PTMD modifies, the PTMD may restore those field values in the response message to values expected by the server before the targeted server receives the response message. Next, control may be returned to a calling process.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of

What is claimed as new and desired to be protected by Letters Patent of the United States is:

1. A method for managing communication for a plurality of computing devices, wherein one or more traffic management devices (TMDs) with one or more processors executing the method that performs actions, comprising:
   receive, by the one or more processors on the one or more TMDs, a message that includes one or more attribute-value-pairs (AVPs) from a server device before it is provided to a client device;
   provide, by the one or more processors on the one or more TMDs, a unique session identifier based on one or more properties of the message, wherein the unique session identifier is associated with a network identifier of the server device;
   add, by the one or more processors on the one or more TMDs, one or more other AVPs that include at least reverse persistence information to the message, wherein the reverse persistence information includes the unique session identifier that identifies the server device;
   modify, by the one or more processors on the one or more TMDs, the one or more AVPs included in the message to remove identification of the server device and include identification of the one or more TMDs;
   forward, by the one or more processors on the one or more TMDs, the modified message to the client device, wherein the modified message includes the added one or more other AVPs;
   when another message that includes the added one or more other AVPs that include the reverse persistence information is received from the client device, performing further actions, including:
      modify, by the one or more processors on the one or more TMDs, the other message by removing the added one or more other AVPs that include the reverse persistence information;
      replace, by the one or more processors on the one or more TMDs, the identification of the one or more TMDs with the identification of the server device; and
      forward, by the one or more processors on the one or more TMDs, the modified other message to the server device that is identified by the unique session identifier included in the reverse persistence information.

2. The method claim of 1, further comprising, provide, by the one or more processors on the one or more TMDs, a response message at the client device that includes the reverse persistence information that was included in the message forwarded to the client device.

3. The method claim 1, wherein forwarding the modified message, further comprises, forwarding the modified message to the client device using the Diameter Protocol.

4. The method claim 1, wherein adding the reverse persistence information to the message, further comprises, adding an attribute value pair that includes at least one identifier employed by the one or more TMDs to identify the server device.

5. The method of claim 1, wherein the reverse persistence information, further comprises, an association between at least a server session identifier and at least a network identity of the server device that is stored in the one or more TMDs.

6. A traffic management device (TMD) for managing communication for a plurality of computing devices, comprising:
   a transceiver that communicates over a network;
   a memory that stores at least instructions; and
   one or more processor devices that execute instructions that perform actions, including:
      receiving a message that includes one or more attribute-value-pairs (AVPs) from a server device before it is provided to a client device;
      providing a unique session identifier based on one or more properties of the message, wherein the unique session identifier is associated with a network identifier of the server device;
      adding one or more other AVPs that include at least reverse persistence information to the message, wherein the at least reverse persistence information includes the unique session identifier that identifies the server device;
      modifying the one or more AVPs included in the message to remove identification of the server device and include identification of the TMD;
      forwarding the modified message to the client device, wherein the modified message includes the added one or more other AVPs;
      when another message that includes the added one or more other AVPs that include the at least reverse persistence information is received from the client device, performing further actions, including:
         modifying the other message by removing the added one or more other AVPs that include the at least reverse persistence information;
         replacing the identification of the TMD with the identification of the server device; and
         forwarding the modified other message to the server device that is identified by the unique session identifier included in the reverse persistence information.

7. The TMD of claim 6, further comprising, generating a response message at the client device that includes the reverse persistence information that was included in the message forwarded to the client device.

8. The TMD of claim 6, wherein forwarding the modified message, further comprises, forwarding the modified message to the client device using the Diameter Protocol.

9. The TMD of claim 6, wherein adding the reverse persistence information to the message, further comprises, adding an attribute value pair that includes at least one identifier employed by the TMD to identify the server device.

10. The TMD of claim 6, wherein the reverse persistence information, further comprises, an association between at least a server session identifier and at least a network identity of the server device that is stored in the TMD.

11. A system for managing communication for a plurality of computing devices, comprising:
    a traffic management device (TMD), comprising:
       a transceiver that communicates over a network;
       a memory that stores at least instructions; and
       one or more processor devices that executes instructions that perform actions, including:
          receiving a message that includes one or more attribute-value-pairs (AVPs) from a server device that is directed to a client device before it is provided to the client device;
          providing a unique session identifier based on one or more properties of the message, wherein the unique session identifier is associated with a network identifier of the server device;

adding one or more other AVPs that include at least reverse persistence information to the modified message, wherein the at least reverse persistence information includes the unique session identifier that identifies the server device;

modifying the one or more AVPs included in the message to remove identification of the server device and include identification of the TMD;

forwarding the modified message to the client device, wherein the modified message includes the added one or more other AVPs;

when another message that includes the added one or more other AVPs that include the at least reverse persistence information is received from the client device, performing further actions, including:

modifying the other message by removing the added one or more other AVPs that include the at least reverse persistence information;

replacing the identification of the TMD with the identification of the server device;

forwarding the modified other message to the server device that is identified by the unique session identifier included in the reverse persistence information; and the client device, comprising:
a transceiver that communicates over the network;
a memory that stores at least instructions; and
one or more processor devices that executes instructions that perform actions, including:
receiving the modified message;
generating the other message to include the reverse persistence information based on at least the modified message, wherein the other message identifies the TMD; and
communicating the other message towards the TMD.

12. The system of claim 11, further comprising, generating a response message at the client device that includes the reverse persistence information that was included in the message forwarded to the client device, wherein the reverse persistence information is included in a Proxy-Info AVP that is included in the response message.

13. The system of claim 11, wherein forwarding the modified message, further comprises, forwarding the modified message to the client device using the Diameter Protocol.

14. The system of claim 11, wherein adding the reverse persistence information to the message, further comprises, adding an attribute value pair that includes at least one identifier employed by the TMD to identify the server device.

15. The system of claim 11, wherein the reverse persistence information, further comprises, an association between at least a server session identifier and at least a network identity of the server device that is stored in the TMD.

16. A processor readable non-transitory storage media that includes instructions for managing communication for a plurality of computing devices that includes one or more traffic management devices (TMDs), wherein execution of the instructions by one or more processor devices on the one or more TMDs perform actions, comprising:

receiving a message that includes one or more attribute-value-pairs (AVPs) from a server device before it is provided to a client device;

providing a unique session identifier based on one or more properties of the message, wherein the unique session identifier is associated with a network identifier of the server device;

adding one or more other AVPs that include the reverse persistence information to the modified message, wherein the at least reverse persistence information includes the unique session identifier that identifies the server device;

modifying the one or more AVPs included in the message to remove identification of the server device and include identification of the one or more TMDs;

forwarding the modified message to the client device, wherein the modified message includes the added one or more other AVPs;

when another message that includes the added one or more other AVPs that include the reverse persistence information is received from the client device, performing further actions, including:

modifying the other message by removing the added one or more other AVPs that include the reverse persistence information;

replacing the identification of the one or more TMDs with the identification of the server device; and forwarding the modified other message to the server device that is identified by the unique session identifier included in the reverse persistence information.

17. The media of claim 16, further comprising, generating a response message at the client device that includes the reverse persistence information that was included in the message forwarded to the client device.

18. The media of claim 16, wherein forwarding the modified message, further comprises, forwarding the modified message to the client device using the Diameter Protocol.

19. The media of claim 16, wherein adding the reverse persistence information to the message, further comprises, adding an attribute value pair that includes at least one identifier employed by the one or more TMDs to identify the server device.

20. The media of claim 16, wherein the reverse persistence information, further comprises, an association between at least a server session identifier and at least a network identity of the server device that is stored in the one or more TMDs.

* * * * *